US012238151B2

(12) United States Patent
Jeon

(10) Patent No.: US 12,238,151 B2
(45) Date of Patent: Feb. 25, 2025

(54) METHOD AND SYSTEM FOR SUPPORTING SHARING OF EXPERIENCES BETWEEN USERS, AND NON-TRANSITORY COMPUTER-READABLE RECORDING MEDIUM

(71) Applicant: ANIPEN INC., Seongnam-si (KR)

(72) Inventor: Jae Woong Jeon, Seoul (KR)

(73) Assignee: ANIPEN INC., Seongnam-si (KR)

( * ) Notice: Subject to any disclaimer, the term of this patent is extended or adjusted under 35 U.S.C. 154(b) by 305 days.

(21) Appl. No.: 17/624,616

(22) PCT Filed: Jul. 1, 2020

(86) PCT No.: PCT/KR2020/008622
§ 371 (c)(1),
(2) Date: Jan. 4, 2022

(87) PCT Pub. No.: WO2021/002687
PCT Pub. Date: Jan. 7, 2021

(65) Prior Publication Data
US 2022/0272133 A1    Aug. 25, 2022

(30) Foreign Application Priority Data

Jul. 4, 2019    (KR) ........................ 10-2019-0080990

(51) Int. Cl.
*G06T 19/00*    (2011.01)
*G06F 3/0484*    (2022.01)
(Continued)

(52) U.S. Cl.
CPC .......... *H04L 65/403* (2013.01); *G06F 3/0484* (2013.01); *G06T 19/006* (2013.01); *H04L 67/141* (2013.01)

(58) Field of Classification Search
CPC ................ H04L 65/403; H04L 67/141; G06F 3/0484; G06T 19/006
See application file for complete search history.

(56) References Cited

U.S. PATENT DOCUMENTS 11,238,644 B2 *  2/2022  Liu ....................... G06V 40/20
2017/0200313 A1  7/2017  Lee et al.
(Continued)

FOREIGN PATENT DOCUMENTS

CN    104376194 A    2/2015
EP    3306444 A1    4/2018
(Continued)

OTHER PUBLICATIONS

Aleks, Buczkowski, "Panama new location-based video sharing app", Sep. 21, 2015, Panama.pdf, 2 pgs. (Year: 2015).*
(Continued)

*Primary Examiner* — Haoshian Shih
(74) *Attorney, Agent, or Firm* — Dinsmore & Shohl LLP; Yongsok Choi, Esq.

(57) ABSTRACT

A method for supporting experience sharing between users is provided. The method includes the steps of: acquiring spatial information on a shared content for experience sharing; providing a user with the shared content in a virtual space created with reference to the spatial information on the shared content; and in response to the user creating an authored content in the virtual space, sharing the authored content with respect to a location matched with a location where the authored content is created in the virtual space.

13 Claims, 14 Drawing Sheets

(51) Int. Cl.
*H04L 65/403* (2022.01)
*H04L 67/141* (2022.01)

(56) References Cited

U.S. PATENT DOCUMENTS

| | | | |
|---|---|---|---|
| 2018/0227506 A1* | 8/2018 | Lee | H04N 5/2624 |
| 2019/0005716 A1 | 1/2019 | Singh et al. | |
| 2019/0005717 A1 | 1/2019 | Singh et al. | |
| 2019/0052870 A1* | 2/2019 | Lutter | G06T 19/003 |
| 2019/0108682 A1 | 4/2019 | Spivack et al. | |
| 2019/0370544 A1* | 12/2019 | Wright, Jr. | G06Q 10/20 |
| 2020/0043244 A1* | 2/2020 | Bhushan | G06F 3/017 |
| 2020/0210602 A1 | 7/2020 | Li et al. | |
| 2020/0314046 A1 | 10/2020 | Jung | |

FOREIGN PATENT DOCUMENTS

| | | |
|---|---|---|
| JP | 2014052607 A | 3/2014 |
| JP | 2014106585 A | 6/2014 |
| JP | 2016510465 A | 4/2016 |
| JP | 2019012443 A | 1/2019 |
| KR | 1020120071281 A | 7/2012 |
| KR | 101235815 B1 | 2/2013 |
| KR | 101623041 B1 | 5/2016 |
| KR | 101666328 B1 | 10/2016 |
| KR | 101713256 B1 | 3/2017 |
| KR | 101932007 B1 | 3/2019 |
| KR | 1020190073032 A | 6/2019 |
| WO | 2019023659 A1 | 1/2019 |

OTHER PUBLICATIONS

Ar Critic: "AnibeaR Review—Social AR Short Video App with Filters, Characters & Stickers" Feb. 21, 2019, XP055946365. URL: https://www.youtube.com/watch?v=Ymv9CGy-_HE.
International Search Report of PCT/KR2020/008622 dated Oct. 13, 2020.

* cited by examiner

FIG. 15A
FIG. 15B
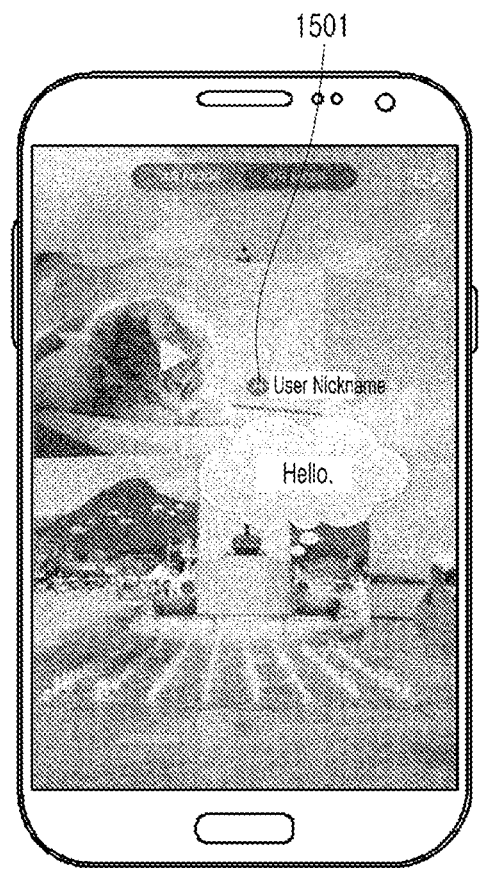
FIG. 16
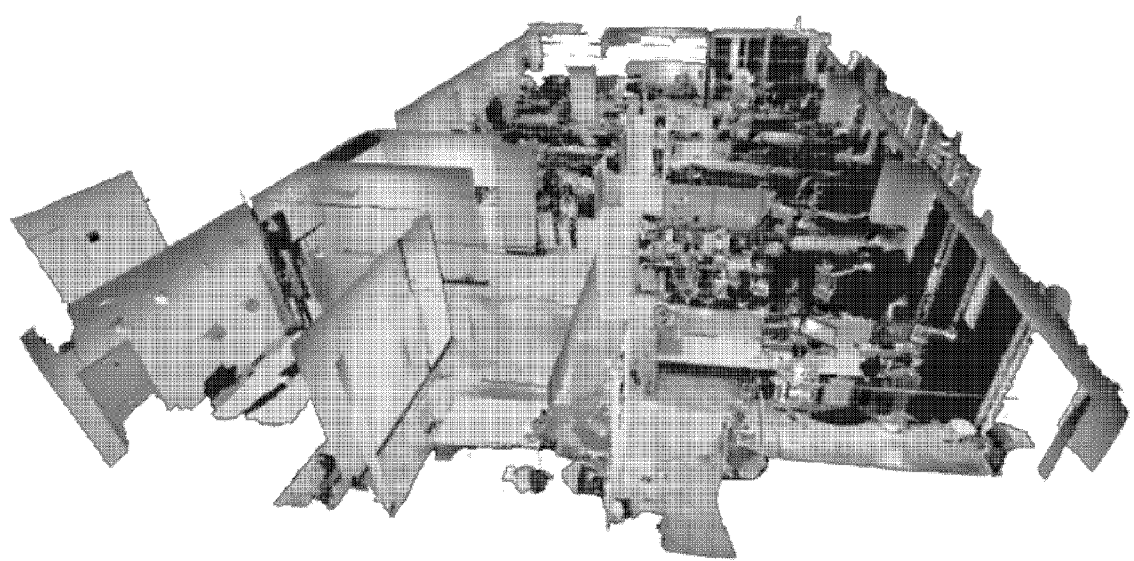

METHOD AND SYSTEM FOR SUPPORTING SHARING OF EXPERIENCES BETWEEN USERS, AND NON-TRANSITORY COMPUTER-READABLE RECORDING MEDIUM

CROSS-REFERENCE TO RELATED APPLICATION(S)

This application is a continuation application of Patent Cooperation Treaty (PCT) International Application No. PCT/KR2020/008622 filed on Jul. 1, 2020, which claims priority to Korean Patent Application No. 10-2019-0080990 filed on Jul. 4, 2019. The entire contents of PCT International Application No. PCT/KR2020/008622 and Korean Patent Application No. 10-2019-0080990 are hereby incorporated by reference.

FIELD OF THE INVENTION

The present invention relates to a method, system, and non-transitory computer-readable recording medium for supporting experience sharing between users.

BACKGROUND

In recent years, there is an increasing demand to share experienced or recorded video contents with others through a social network service (SNS) or the like.

As an example of related conventional techniques, Korean Registered Patent Publication No. 1713256 discloses a system for providing a SNS content creation and sharing platform, comprising: a server for providing a platform for SNS content creation and sharing services; and a terminal for providing a user input interface to a user through the platform and receiving post information to be shared through the SNS from the user, wherein the server receives the post information inputted by the user from one or more terminals to generate one or more squares on the basis of the received post information, and controls the one or more generated squares to be shared through the SNS, and the square is an SNS content generated by the server converting the post information inputted by the user according to a predetermined criterion.

However, according to the techniques introduced so far as well as the above-described conventional technique, opinions on playing contents shared by other users can only be exchanged on a separate web page, bulletin board, comment section, or the like, which causes experiences to be passively shared only through the shared contents, and hinders interactive communication between the users. Further, it is difficult to author additional contents on the basis of contents created by other users, without professional knowledge about content editing.

In this connection, the inventor(s) present a novel and inventive technique to enable active experiences, authoring of new contents, or interactive communication with other users, on the basis of contents created and shared by other users.

SUMMARY OF THE INVENTION

One object of the present invention is to solve all the above-described problems in the prior art.

Another object of the invention is to support a vivid experience of a shared content in a virtual space associated with the shared content.

Yet another object of the invention is to support authoring of a new content in a virtual space associated with a shared content.

Still another object of the invention is to support a plurality of users to interactively communicate in a virtual space associated with a shared content.

Still yet another object of the invention is to provide a user experience in which an augmented reality video and a virtual reality video are spatially connected.

The representative configurations of the invention to achieve the above objects are described below.

According to one aspect of the invention, there is provided a method for supporting experience sharing between users, the method comprising the steps of: acquiring spatial information on a shared content for experience sharing; providing a user with the shared content in a virtual space created with reference to the spatial information on the shared content; and in response to the user creating an authored content in the virtual space, sharing the authored content with respect to a location matched with a location where the authored content is created in the virtual space.

According to another aspect of the invention, there is provided a system for supporting experience sharing between users, the system comprising: a spatial information acquisition unit configured to acquire spatial information on a shared content for experience sharing; a content provision unit configured to provide a user with the shared content in a virtual space created with reference to the spatial information on the shared content; and a sharing management unit configured to, in response to the user creating an authored content in the virtual space, share the authored content with respect to a location matched with a location where the authored content is created in the virtual space.

In addition, there are further provided other methods and systems to implement the invention, as well as non-transitory computer-readable recording media having stored thereon computer programs for executing the methods.

According to the invention, it is possible to vividly experience a shared content in a virtual space associated with the shared content.

According to the invention, it is possible to author a new content in a virtual space associated with a shared content.

According to the invention, it is possible for a plurality of users to interactively communicate in a virtual space associated with a shared content.

According to the invention, it is possible to provide a user experience in which an augmented reality video and a virtual reality video are spatially connected.

BRIEF DESCRIPTION OF THE DRAWINGS

FIGS. 15A and 15B illustratively show a situation in which experiences are shared between users according to one embodiment of the invention.

FIG. 16 illustratively shows a situation in which experiences are shared between users according to one embodiment of the invention.

DETAILED DESCRIPTION OF THE INVENTION

Figure 1:
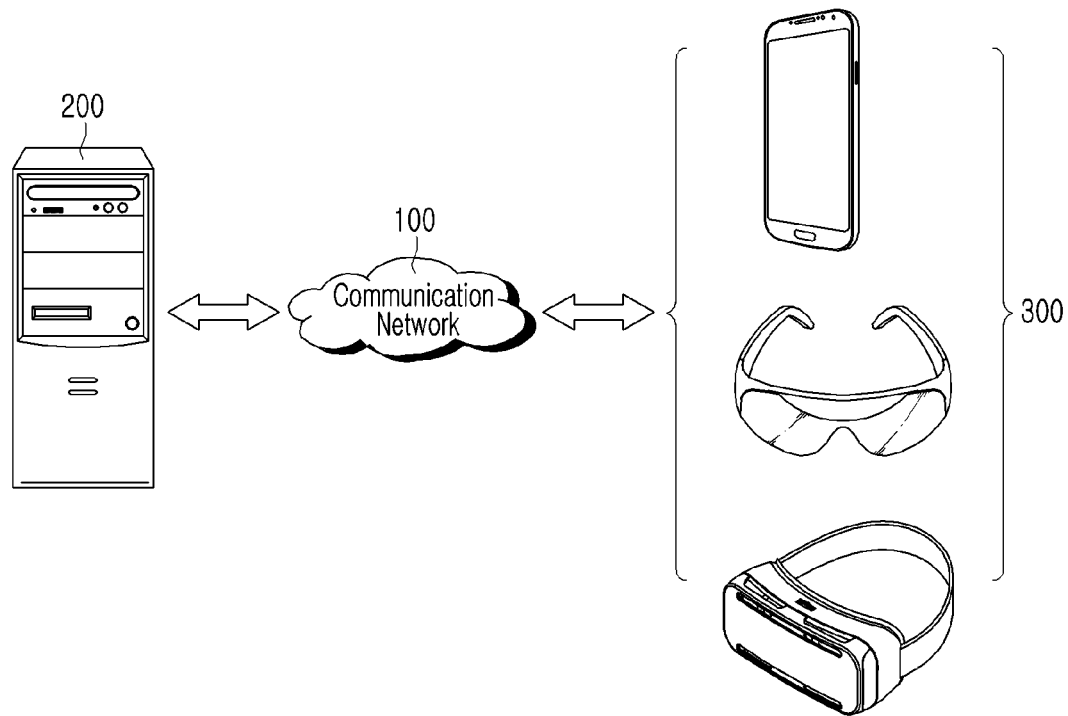
FIG. 1 schematically shows the configuration of an entire system for supporting experience sharing between users according to one embodiment of the invention.

In the following detailed description of the present invention, references are made to the accompanying drawings that show, by way of illustration, specific embodiments in which the invention may be practiced. These embodiments are described in sufficient detail to enable those skilled in the art to practice the invention. It is to be understood that the various embodiments of the invention, although different from each other, are not necessarily mutually exclusive. For example, specific shapes, structures and characteristics described herein may be implemented as modified from one embodiment to another without departing from the spirit and scope of the invention. Furthermore, it shall be understood that the positions or arrangements of individual elements within each embodiment may also be modified without departing from the spirit and scope of the invention. Therefore, the following detailed description is not to be taken in a limiting sense, and the scope of the invention is to be taken as encompassing the scope of the appended claims and all equivalents thereof. In the drawings, like reference numerals refer to the same or similar elements throughout the several views.

Herein, the term "content" or "contents" encompasses digital information or individual information elements comprised of text, symbol, speech, sound, image, video, and the like, which are accessible via communication networks. For example, such contents may comprise data such as text, image, video, audio, and links (e.g., web links) or a combination of at least two types of such data. More specifically, such contents may include a content related to a character, a volumetric video, a point cloud, an object composed of polygons, or the like. Hereinafter, various preferred embodiments of the present invention will be described in detail with reference to the accompanying drawings to enable those skilled in the art to easily implement the invention.

Configuration of the Entire System

FIG. 1 schematically shows the configuration of the entire system for supporting experience sharing between users according to one embodiment of the invention.

As shown in FIG. 1, the entire system according to one embodiment of the invention may comprise a communication network 100, a support system 200, and a device 300.

First, the communication network 100 according to one embodiment of the invention may be implemented regardless of communication modality such as wired and wireless communications, and may be constructed from a variety of communication networks such as local area networks (LANs), metropolitan area networks (MANs), and wide area networks (WANs). Preferably, the communication network 100 described herein may be the Internet or the World Wide Web (WWW). However, the communication network 100 is not necessarily limited thereto, and may at least partially include known wired/wireless data communication networks, known telephone networks, or known wired/wireless television communication networks.

For example, the communication network 100 may be a wireless data communication network, at least a part of which may be implemented with a conventional communication scheme such as radio frequency (RF) communication, WiFi communication, cellular communication (e.g., Long Term Evolution (LTE) communication), Bluetooth communication (more specifically, Bluetooth Low Energy (BLE) communication), infrared communication, and ultrasonic communication.

Next, the support system 200 according to one embodiment of the invention may be a digital device having a memory means and a microprocessor for computing capabilities. The support system 200 may be a server system.

The support system 200 according to one embodiment of the invention may function to: acquire spatial information on a shared content for experience sharing; provide a user with the shared content in a virtual space created with reference to the spatial information on the shared content; and in response to the user creating an authored content in the virtual space, share the authored content with respect to a location matched with a location where the authored content is created in the virtual space.

The shared content for experience sharing according to one embodiment of the invention may refer to a content that is created on the basis of a real-world place or a virtual place, and allowed to be shared to (e.g., watched, viewed, or experienced by) at least one user. For example, the shared content may be a content created on the basis of a real-world place, such as a CCTV video or image, a 360-degree camera video or image, a smart phone video or image, a dashboard camera video or image, a drone video or image, a three-dimensional point cloud (or a point cloud image or video), and a three-dimensional mesh (or a mesh image or video), or a content created on the basis of a virtual place, such as a virtual reality (VR) video.

The configuration and functions of the support system 200 according to the invention will be discussed in more detail below. Meanwhile, although the support system 200 has been described as above, the above description is illustrative, and it will be apparent to those skilled in the art that at least a part of the functions or components required for the support system 200 may be implemented or included in the device 300 to be described below or an external system (not shown), as necessary.

Next, the device 300 (e.g., a device of the user) according to one embodiment of the invention is digital equipment that may function to connect to and then communicate with the support system 200 via the communication network 100, and any type of portable digital equipment having a memory means and a microprocessor for computing capabilities, such as a smart phone, a tablet PC, smart glasses (e.g., capable of supporting augmented reality (AR), virtual reality (VR), mixed reality (MR), extended reality (XR), etc.), and a head-mounted display (e.g., capable of supporting AR, VR, MR, XR, etc.), may be adopted as the device 300 according to the invention. Further, according to one embodiment of the invention, the device 300 may include a photographing and scanning module for creating the shared content (e.g., a camera or LiDAR), a display module for providing the virtual space or the shared content (e.g., an LCD, an LED display, or an OLED display), and the like.

Meanwhile, the device 300 according to one embodiment of the invention may include an application for supporting the functions of supporting experience sharing between users according to the invention. The application may be downloaded from the support system 200 or an external application distribution server (not shown).

Configuration of the Support System

Hereinafter, the internal configuration of the support system 200 crucial for implementing the invention and the functions of the respective components thereof will be discussed.

Figure 2:
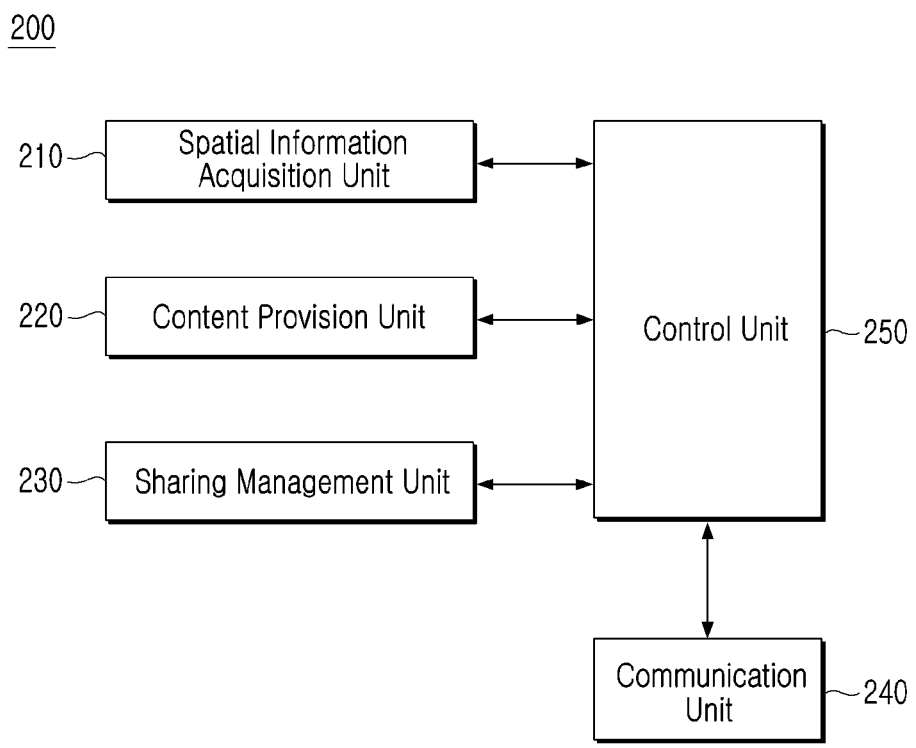
FIG. 2 specifically shows the internal configuration of a support system according to one embodiment of the invention.

FIG. 2 specifically shows the internal configuration of the support system 200 according to one embodiment of the invention.

As shown in FIG. 2, the support system 200 according to one embodiment of the invention may comprise a spatial information acquisition unit 210, a content provision unit 220, a sharing management unit 230, a communication unit 240, and a control unit 250. According to one embodiment of the invention, at least some of the spatial information acquisition unit 210, the content provision unit 220, the sharing management unit 230, the communication unit 240, and the control unit 250 may be program modules that communicate with an external system. The program modules may be included in the support system 200 in the form of operating systems, application program modules, and other program modules, while they may be physically stored in a variety of commonly known storage devices. Further, the program modules may also be stored in a remote storage device that may communicate with the support system 200. Meanwhile, such program modules may include, but are not limited to, routines, subroutines, programs, objects, components, and data structures for performing specific tasks or executing specific abstract data types according to the invention as will be described below.

First, the spatial information acquisition unit 210 according to one embodiment of the invention may function to acquire spatial information on a shared content for experience sharing. The spatial information on the shared content according to one embodiment of the invention may include information on a geography, a location, an object, a theme, and the like of a real-world place or a virtual place associated with the shared content.

For example, when the shared content is a content created by photographing a real-world place, the spatial information acquisition unit 210 may acquire, as the spatial information on the shared content, information on at least one of a location (in absolute coordinates (e.g., geographic coordinates such as GPS coordinates) or relative coordinates) corresponding to the real-world place where the shared content is photographed, a direction in which the real-world place is photographed in the shared content (e.g., a direction angle or azimuth for a subject in the shared content), an object (e.g., a subject) located in the real-world place where the shared content is photographed, a point cloud related to a space or object scanned in the real-world place where the shared content is photographed (e.g., a building located in the real-world place), and a theme specified in the shared content. Meanwhile, the theme according to one embodiment of the invention may refer to a main object specified in the shared content or an object that may be adopted as a reference, and may encompass not only a tangible object but also an intangible object (e.g., the sky, sea, atmosphere, or the like). For example, the theme may be specified as an object having the greatest importance (or percentage) in the shared content, or an object having public awareness at or above a predetermined level. Here, the awareness may be determined, for example, with reference to a social network service (SNS), a web database, and the like, or on the basis of a result of analyzing disclosed information (e.g., public information, SNS information, and the like) or non-disclosed information (e.g., personal information) using artificial intelligence (e.g., deep learning).

More specifically, when the shared content is a video content created by photographing the Eiffel Tower in Paris, France, the spatial information acquisition unit 210 may specify the theme as the Eiffel Tower whose awareness is at or above a predetermined level, and may acquire information on at least one of a shape (which may encompass both an imaginal shape or a shape based on spatial data such as a point cloud), location, and orientation of the Eiffel Tower in the shared content (i.e., information on the theme) as the spatial information on the shared content. Further, the spatial information acquisition unit 210 may acquire information on at least one of a location, height, width, and area of the Eiffel Tower (i.e., information on the object) as the spatial information on the shared content.

Meanwhile, the spatial information acquisition unit 210 according to one embodiment of the invention may specify or estimate information on an object in the shared content by performing machine learning or deep learning focusing on information on a shape, location, size, area, width, volume, and the like of the object (i.e., information on properties of the object).

Next, the content provision unit 220 according to one embodiment of the invention may function to provide a user with the shared content in a virtual space created with reference to the spatial information on the shared content acquired by the spatial information acquisition unit 210. The virtual space according to one embodiment of the invention is a virtual space (which may consist of a two-dimensional or three-dimensional space) implemented equally or similarly to a real-world place or a virtual place associated with the shared content, and may be created on the same scale as the space specified or limited in the shared content, or created based on the space on a scale expanded by a predetermined extent.

For example, the content provision unit 220 may specify a plurality of videos (or images) related to a place associated with the shared content with reference to the spatial information on the shared content, and may create the virtual space on the basis of the plurality of specified videos (or images). (Meanwhile, when the shared content is two-dimensional, the shared content may be reconstructed in three dimensions on the basis of the plurality of videos). More specifically, the content provision unit 220 may create the virtual space by matching (e.g., horizontally translating, vertically translating, rotating, or resizing) the plurality of videos (or images) on the basis of at least one of a photographing position and a photographing direction of the shared content (e.g., to coincide with at least one of the photographing position and the photographing direction of the shared content), on the basis of at least one of a shape, size, location, and orientation of a theme specified in the shared content (e.g., to coincide with at least one of the shape, size, location, and orientation of the theme specified in the shared content), or on the basis of a point cloud related to the place associated with the shared content (e.g., to coincide with at least one of a shape, size, location, and orientation of the point cloud related to the place associated with the shared content). In this case, for example, even if the shared content includes only a two-dimensional video content related to a subject, a three-dimensional virtual space may be created by matching a plurality of three-dimensional videos (or images) associated with the shared content on the basis of information on at least one of a photographing position and a photographing direction of the shared content, or information on at least one of a shape, size, location, and orientation of a theme specified in the shared content. Meanwhile, according to one embodiment of the invention, the plurality of videos may be acquired from at least one of public videos (or images) and private videos (or images) related to a real-world place or a virtual place associated with the shared content. For example, the content provision unit 220 may acquire the plurality of videos (or images) associated with the shared content from CCTV videos (e.g., videos of a CCTV installed in a concert hall or store), SNS videos, or YouTube videos that are photographed in a position or direction identical or similar to the photographing position or photographing direction of the shared content within a predetermined distance from the real-world place or virtual place associated with the shared content. (The plurality of videos may be acquired in real time through a streaming method or the like). Meanwhile, the content provision unit 220 may also acquire all or part of the plurality of videos (or images) associated with the shared content as the spatial information on the shared content.

As another example, the content provision unit 220 may specify a plurality of point clouds related to a place associated with the shared content with reference to the spatial information on the shared content, and may create the virtual space on the basis of the plurality of specified point clouds (e.g., such that at least one of shapes, sizes, locations, boundaries, and orientations of the plurality of specified point clouds coincide with each other). More specifically, the content provision unit 220 may create the virtual space by matching (e.g., horizontally translating, vertically translating, rotating, or resizing) a plurality of point clouds related to objects scanned in a real-world place where the shared content is photographed (see FIG. 16).

As yet another example, when the shared content is a 360-degree video, the content provision unit 220 may directly create a virtual space identical or similar to a real-world place or a virtual place associated with the shared content with reference to the spatial information on the shared content, without using the plurality of videos as above. In this case, the content provision unit 220 may expand the virtual space by a predetermined extent by matching (e.g., horizontally translating, vertically translating, rotating, or resizing) a plurality of videos associated with the expanded space to create an expanded virtual space.

Further, the content provision unit 220 may cause a space connection object, which is intended to provide a user experience in which the virtual space is spatially connected with a place where the user is located, to be displayed as augmented on a background video of the place where the user is located. According to one embodiment of the invention, the place where the user is located may be a real-world place, a virtual reality (VR) place, or a mixed reality (MR) place in which the real world and virtual reality are mixed.

For example, the content provision unit 220 may cause a space connection object in a two-dimensional shape such as a circle, an ellipse, or a square or in a three-dimensional shape such as a sphere, a hemisphere, a cuboid, or a cube (or possibly a character, a volumetric video, a point cloud, an object composed of polygons, or the like) to be displayed as augmented on a background video of a real-world place or a virtual reality place where the user is located. In this case, according to one embodiment of the invention, at least a part of the virtual space may be displayed as projected or overlapped on the space connection object. That is, at least a part of the virtual space may be projected or overlapped to improve the user experience in which the virtual space is spatially connected with the place where the user is located.

Meanwhile, when it is determined that the user is located in a place that meets a predetermined trigger condition (e.g., a real-world place, a virtual reality (VR) place, or a mixed reality (MR) place in which the real world and virtual reality are mixed), the content provision unit 220 may cause the space connection object to be displayed as augmented on a background video of the place where the user is located. According to one embodiment of the invention, the place that meets a predetermined trigger condition may refer to a place with predetermined requirements that allow the virtual space to be displayed to the user.

For example, when the place that meets a predetermined trigger condition is a real-world place where three surfaces of a room are located within a predetermined distance from a user (e.g., a user device), the content provision unit 220 may determine that the trigger condition is satisfied when the user is located at the corner of the room, and may cause the space connection object to be displayed as augmented on a background video of the real-world place where the user is located.

Next, when an authored content is created by the user in the virtual space created by the content provision unit 220, the sharing management unit 230 may function to share the authored content with respect to a location matched with a location where the authored content is created in the virtual space.

For example, when the user creates (e.g., tags) a content related to at least one of a text, image, video, and sound with respect to a predetermined location in the virtual space (or a content including a character, a volumetric video, a point cloud, an object composed of polygons, or the like on a background video of a virtual reality place) as the authored content, the sharing management unit 230 may cause the tagged authored content to be identically displayed to another user (specifically, another user device) located at a real-world location that is matched with the location where the authored content is created in the virtual space. According to one embodiment of the invention, the matched real-world location may be specified with respect to absolute coordinates (e.g., geographic coordinates such as GPS coordinates) or relative coordinates of the location where the authored content is tagged in the virtual space. Meanwhile, the location matched with the location where the authored content is created in the virtual space may be more accurately specified with further reference to at least one public or private database for a three-dimensional map or a three-dimensional space related to the location.

More specifically, when the location where the authored content is created by the user in the virtual space is a wall of a building, the sharing management unit 230 may cause the same content as the authored content to be displayed in real time as augmented on the wall of the building in the real world.

Next, the communication unit 240 according to one embodiment of the invention may function to enable data transmission/reception from/to the spatial information acquisition unit 210, the content provision unit 220, and the sharing management unit 230.

Lastly, the control unit 250 according to one embodiment of the invention may function to control data flow among the spatial information acquisition unit 210, the content provision unit 220, the sharing management unit 230, and the communication unit 240. That is, the control unit 250 according to the invention may control data flow into/out of the support system 200 or data flow among the respective components of the support system 200, such that the spatial information acquisition unit 210, the content provision unit 220, the sharing management unit 230, and the communication unit 240 may carry out their particular functions, respectively.

Hereinafter, situations in which contents are shared according to one embodiment of the invention will be described in detail with reference to FIGS. 3 to 11.

FIGS. 3 to 11 illustratively show situations in which experiences are shared between users according to one embodiment of the invention.

First Embodiment

Figure 3:
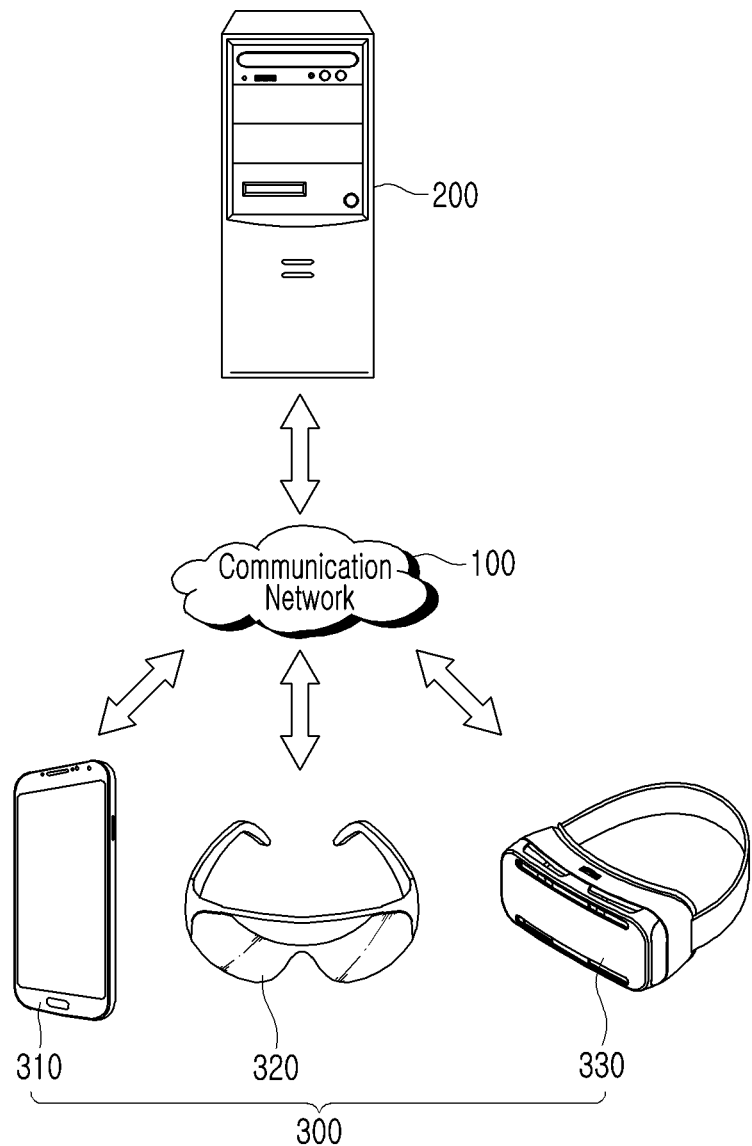
FIG. 3 illustratively shows a situation in which experiences are shared between users according to one embodiment of the invention.
Figure 4A:
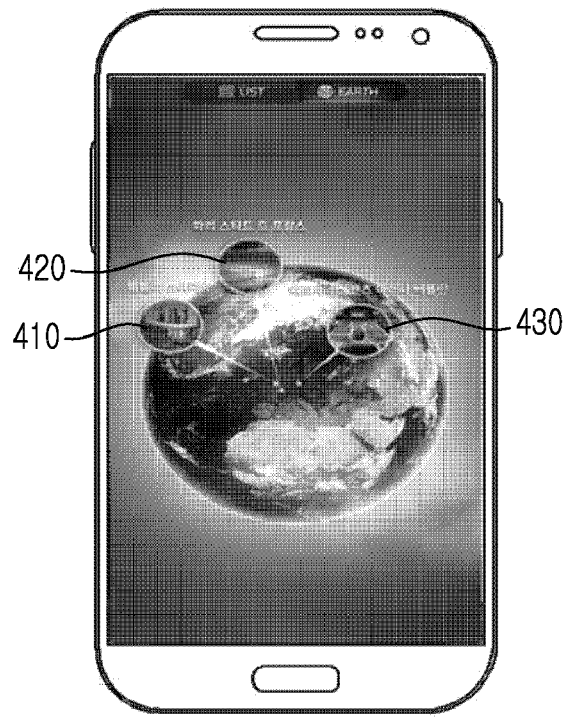
FIGS. 4A to 4D illustratively show a situation in which experiences are shared between users according to one embodiment of the invention.
Figure 4B:
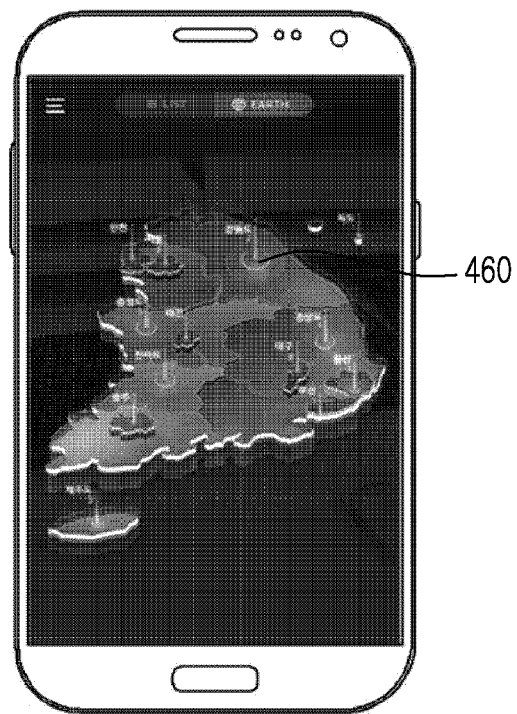
Figure 4C:
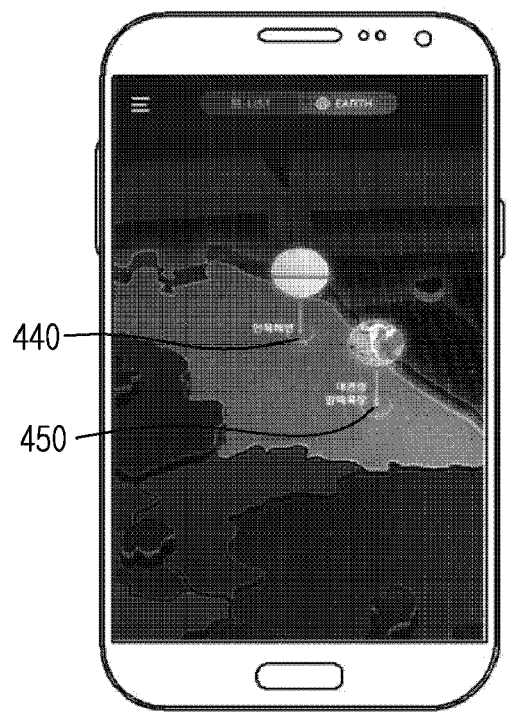
Figure 4D:
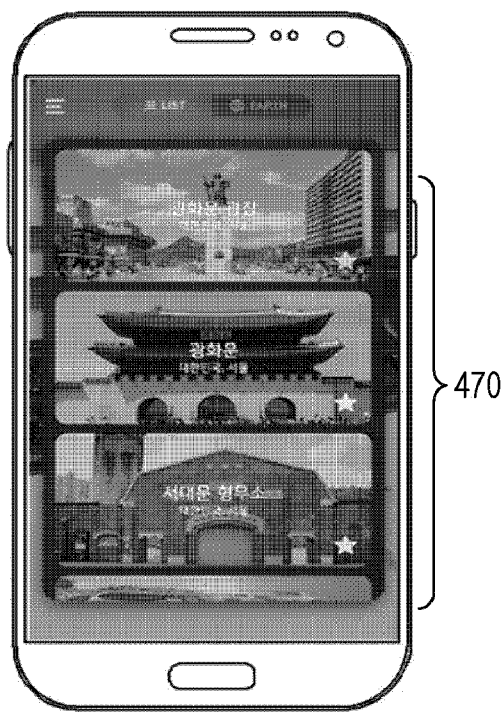

Referring to FIG. 3, it may be assumed that a shared content is provided by a first user (specifically, a first user device 310) and shared to a second user (specifically, a second user device 320) and a third user (specifically, a third user device 330).

First, spatial information on a plurality of shared contents including the shared content provided by the first user may be acquired, and virtual spaces may be respectively created with reference to the spatial information on the plurality of shared contents.

For example, referring to FIGS. 4A to 4D, spatial information on each of a plurality of shared contents including shared contents about major attractions or major tourist spots (e.g., Wembley Stadium, Stade de France in Paris, and Mercedes-Benz Arena in Berlin) may be acquired, and a plurality of virtual spaces associated with the plurality of shared contents may be created with reference to the spatial information on each of the plurality of shared contents.

Next, a plurality of space connection objects (e.g., portals) for spatially connecting the plurality of virtual spaces with a virtual place where the second or third user is located may be displayed as augmented on a background of the virtual place where the second or third user is located.

For example, when the virtual place where the second or third user is located is the universe, a plurality of space connection objects 410, 420, and 430 for spatially connecting the universe with the plurality of virtual spaces may be displayed as augmented on a background of the universe.

As another example, when the virtual place where the second or third user is located is a virtual personal space (e.g., a virtual house or a virtual island), a plurality of space connection objects for spatially connecting the virtual personal space with the plurality of virtual spaces may be displayed as augmented on a background of the virtual personal space.

Meanwhile, a plurality of space connection objects 440, 450, 460, and 470 for spatially connecting the virtual place where the second or third user is located with the plurality of virtual spaces may be displayed as augmented on a background of a predetermined map or list.

Second Embodiment

According to one embodiment of the invention, it may be assumed that a shared content for experience sharing is shared to a user located in an office or a shopping mall.

First, spatial information on a shared content for experience sharing may be acquired.

For example, spatial information on a shared content created on the basis of the Gwanghwamun Street among real-world places may be acquired. Further, spatial information on a shared content created on the basis of the Sahara desert among virtual places may be acquired.

Next, a virtual space may be created with reference to the spatial information on the shared content.

For example, a virtual space associated with the shared content created on the basis of the Gwanghwamun Street may be created with reference to the spatial information on the shared content. Further, a virtual space associated with the shared content created on the basis of the Sahara desert may be created with reference to the spatial information on the shared content.

Next, the shared content may be provided to the user in the created virtual space.

Figure 5A:
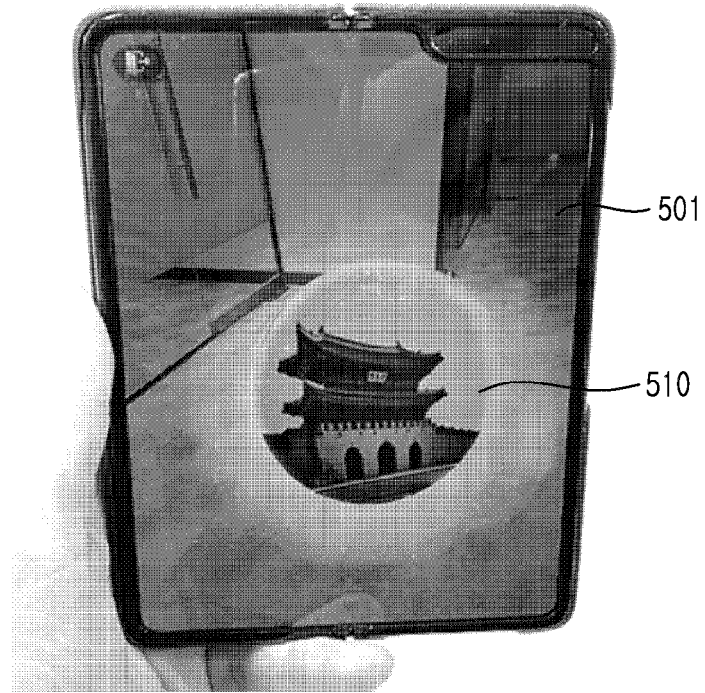
FIGS. 5A and 5B illustratively show a situation in which experiences are shared between users according to one embodiment of the invention.

For example, referring to FIG. 5A, a space connection object 510, which is intended to provide a user experience in which the virtual space is spatially connected with an office 501 where the user is located, may be displayed as augmented on a background real-world video of the office 501 where the user is located. Further, referring to FIG. 6A, a space connection object 610, which is intended to provide a user experience in which the virtual space is spatially connected with a shopping mall 601 where the user is located, may be displayed as augmented on a background real-world video of the shopping mall 601 where the user is located. In addition, referring to FIG. 6B, when the user approaches or zooms in toward the space connection object 610, a user experience in which the user enters the virtual space through the space connection object 610 may be provided.

Next, when an authored content is created by the user in the virtual space, the authored content may be shared with respect to a location matched with the location where the authored content is created in the virtual space.

Figure 5B:
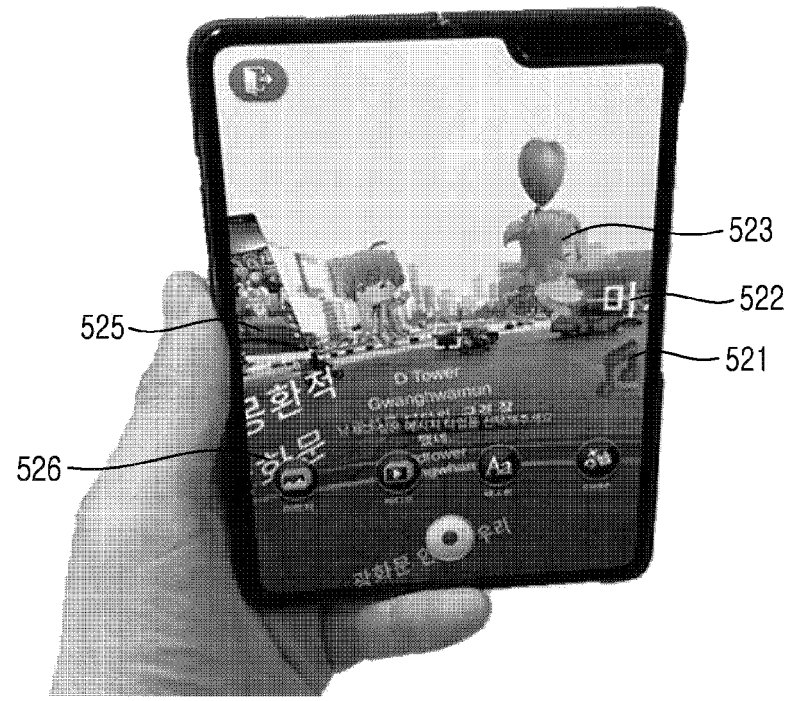
Figure 6A:
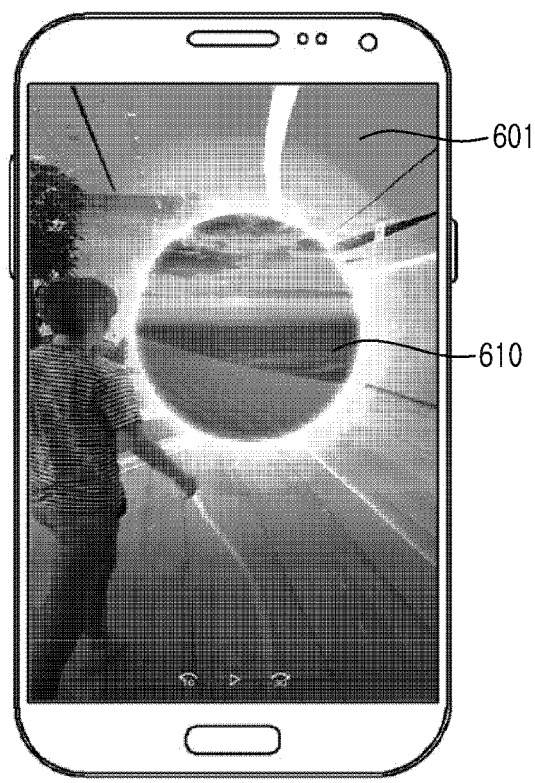
FIGS. 6A and 6B illustratively show a situation in which experiences are shared between users according to one embodiment of the invention.
Figure 6B:
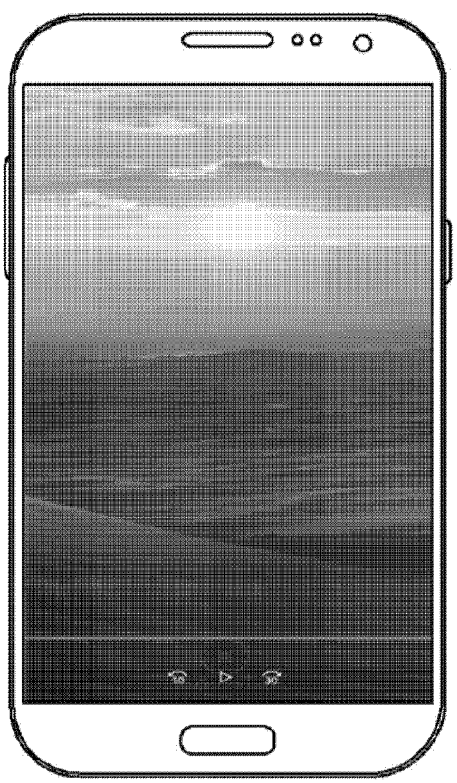

For example, referring to FIG. 5B, when authored contents 521 to 526 related to texts and images are created by the user in the Gwanghwamun Street, the authored contents may be shared with respect to the actual Gwanghwamun Street, which is a location matched with the location where the authored contents are created. More specifically, the same contents as the authored contents 521 to 526 may be displayed in real time as augmented to another user (specifically, another user's device) located in the actual Gwanghwamun Street.

Figure 14C:
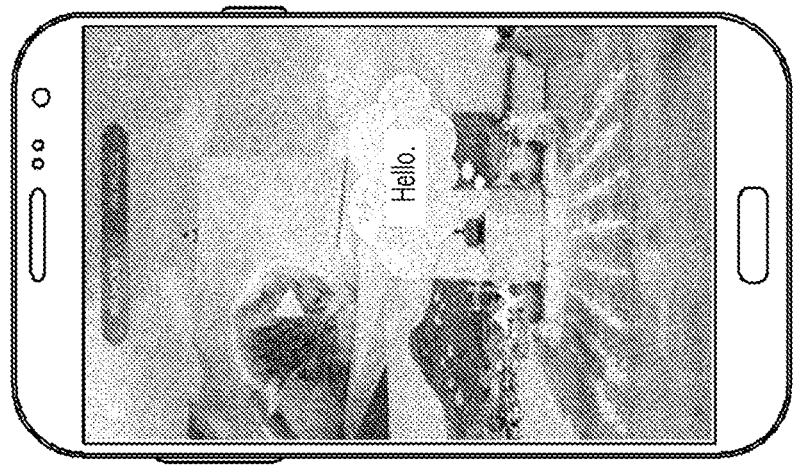
FIGS. 14A to 14C illustratively show a situation in which experiences are shared between users according to one embodiment of the invention.
Figure 14B:
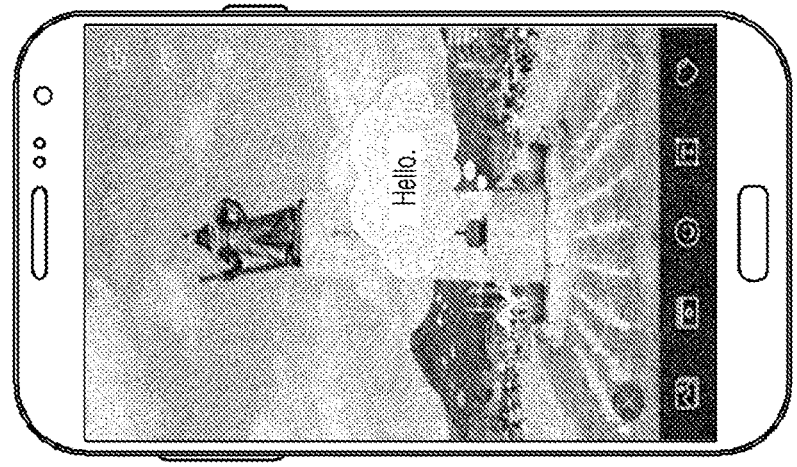
Figure 14A:
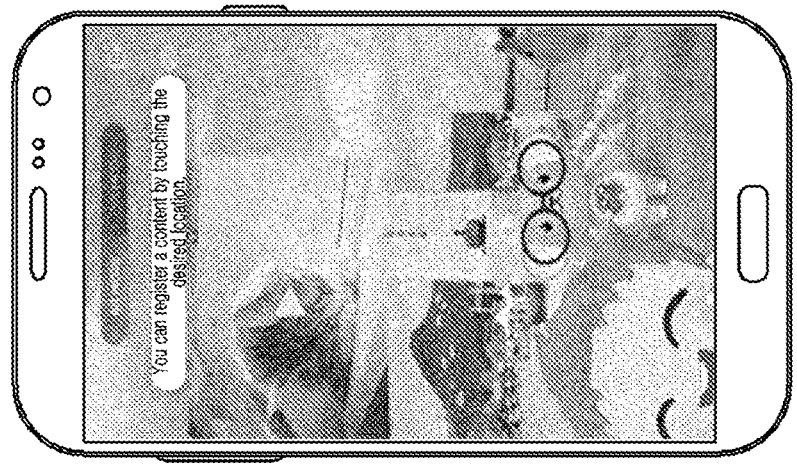

As another example, referring to FIGS. 12A to 15B, when an authored content 1301 related to a text and an image (see FIGS. 13A to 13D) is created by the user in the Gwanghwamun Street which is a virtual space (see FIGS. 12A and 12B), the authored content may be shared with respect to the virtual Gwanghwamun Street, which is matched with the location where the authored content is created (see FIGS. 14A to 14C). Further, the authored content may be tagged with information on the user who has created the authored content (e.g., an ID, creation time, creation place, and the like) (see 1501 and 1502).

Meanwhile, when it is determined that the user is located in a real-world place or a virtual place that meets a predetermined trigger condition, the space connection object 510 or 610 may be displayed as augmented on a background real-world video of the office 501 or shopping mall 601 where the user is located.

Third Embodiment

According to one embodiment of the invention, it may be assumed that a shared content is provided by a first user (specifically, a first user device 310) and shared to a second user (specifically, a second user device 320) and a third user (specifically, a third user device 330) in real time. Specifically, it may be assumed that chatting is performed between the first user, the second user, and the third user in a virtual space created on the basis of spatial information on the shared content provided by the first user.

Figure 7:
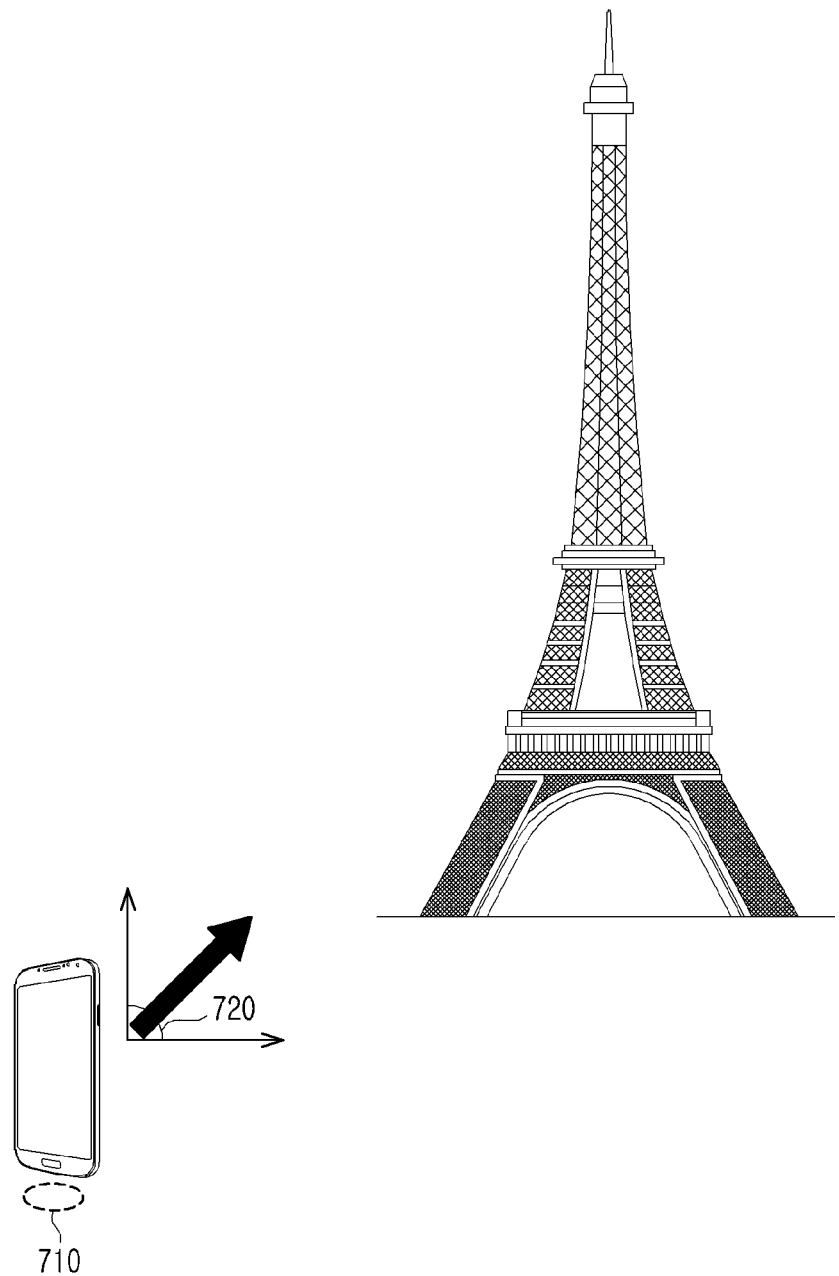
FIG. 7 illustratively shows a situation in which experiences are shared between users according to one embodiment of the invention.
Figure 8:
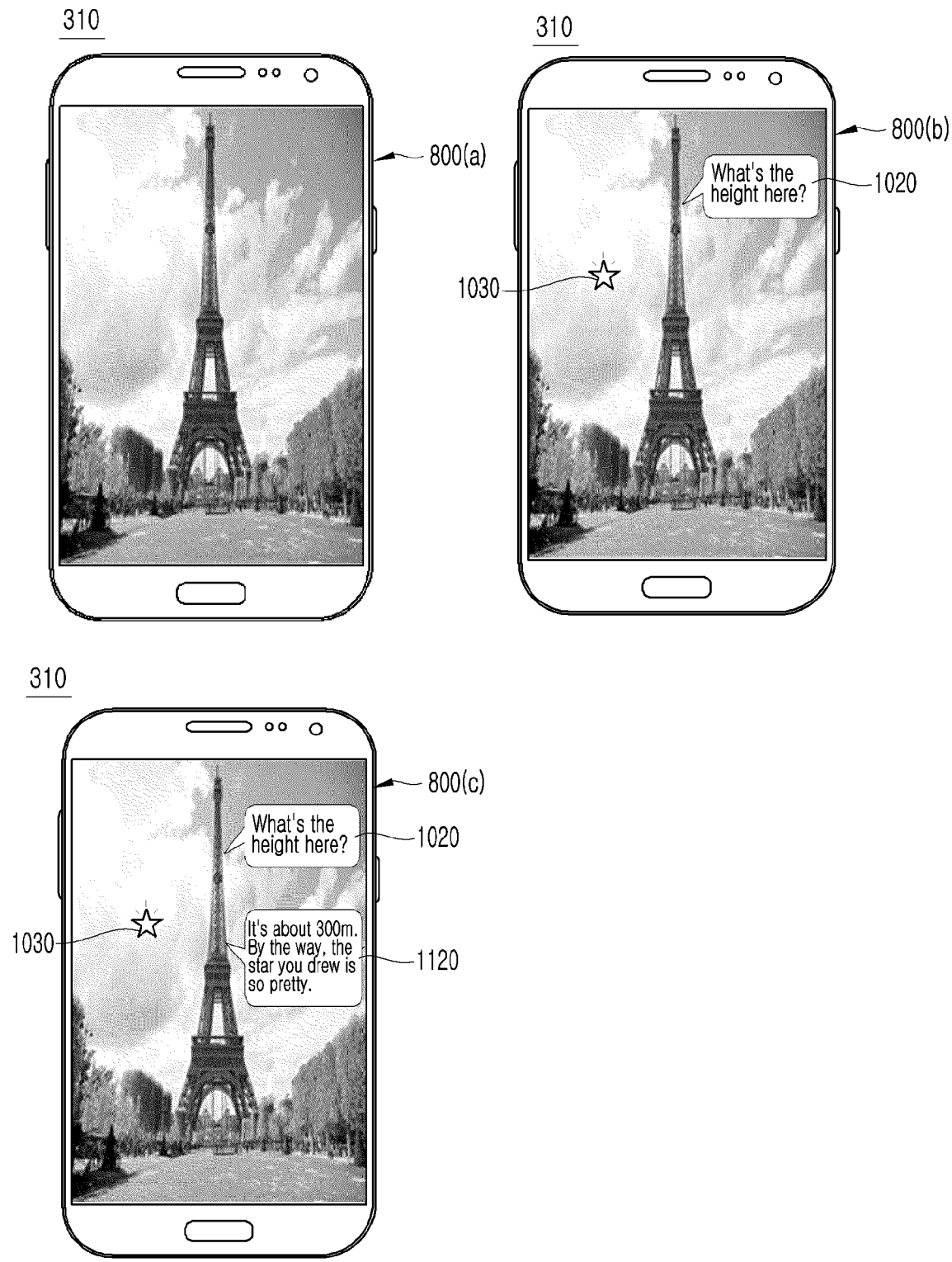
FIG. 8 illustratively shows a situation in which experiences are shared between users according to one embodiment of the invention.

First, referring to FIGS. 7 and 8, a shared content with the Eiffel Tower in Paris, France in a background may be created by the first user (specifically, the first user device 310).

Further, a virtual space may be created with reference to spatial information on the shared content.

For example, a point cloud related to a place associated with the shared content may be specified on the basis of the spatial information on the shared content, and the virtual space may be created on the basis of the specified point cloud (e.g., to coincide with at least one of shapes, sizes, locations, boundaries, and orientations of a plurality of point clouds including the specified point cloud).

Figure 10:
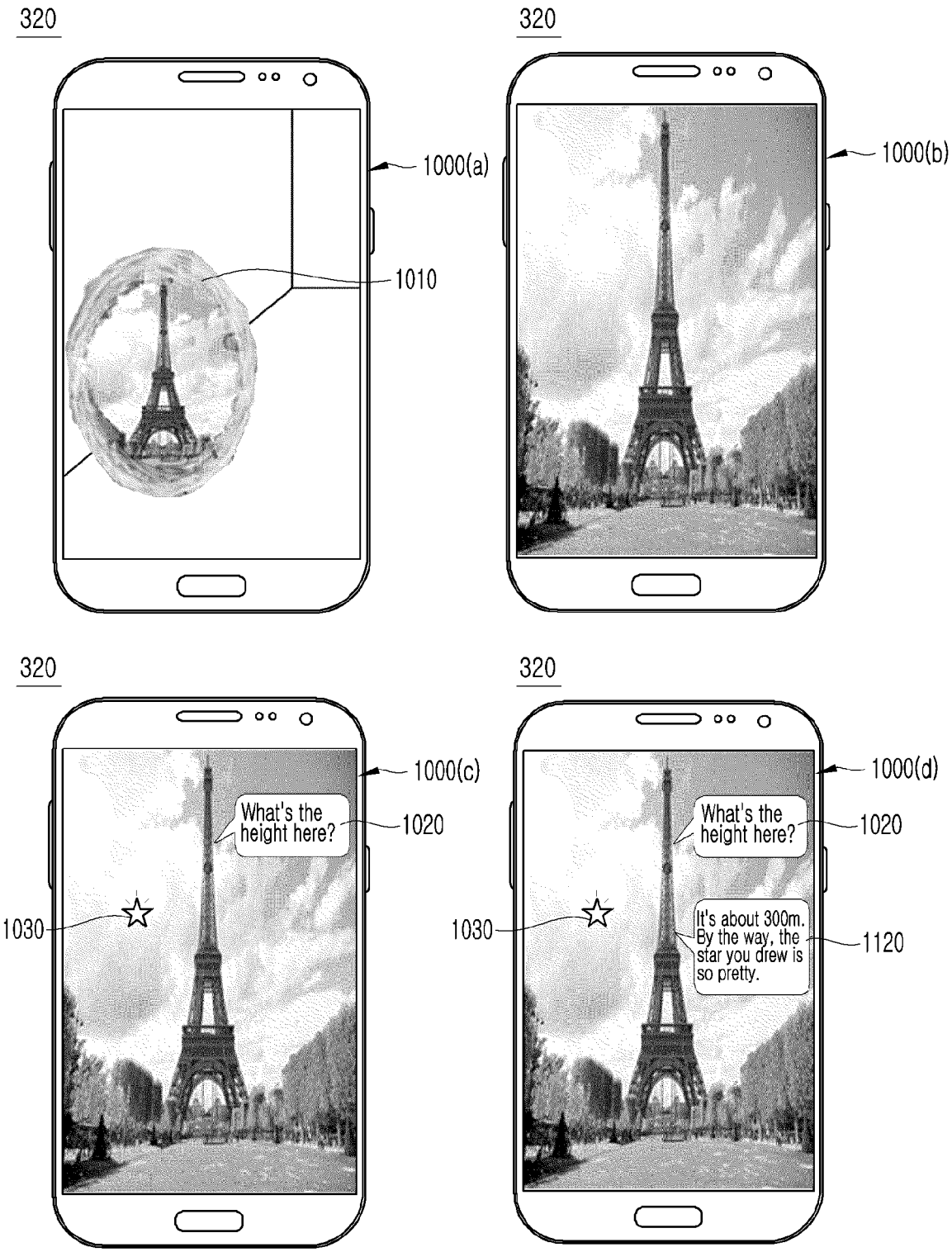
FIG. 10 illustratively shows a situation in which experiences are shared between users according to one embodiment of the invention.
Figure 11:
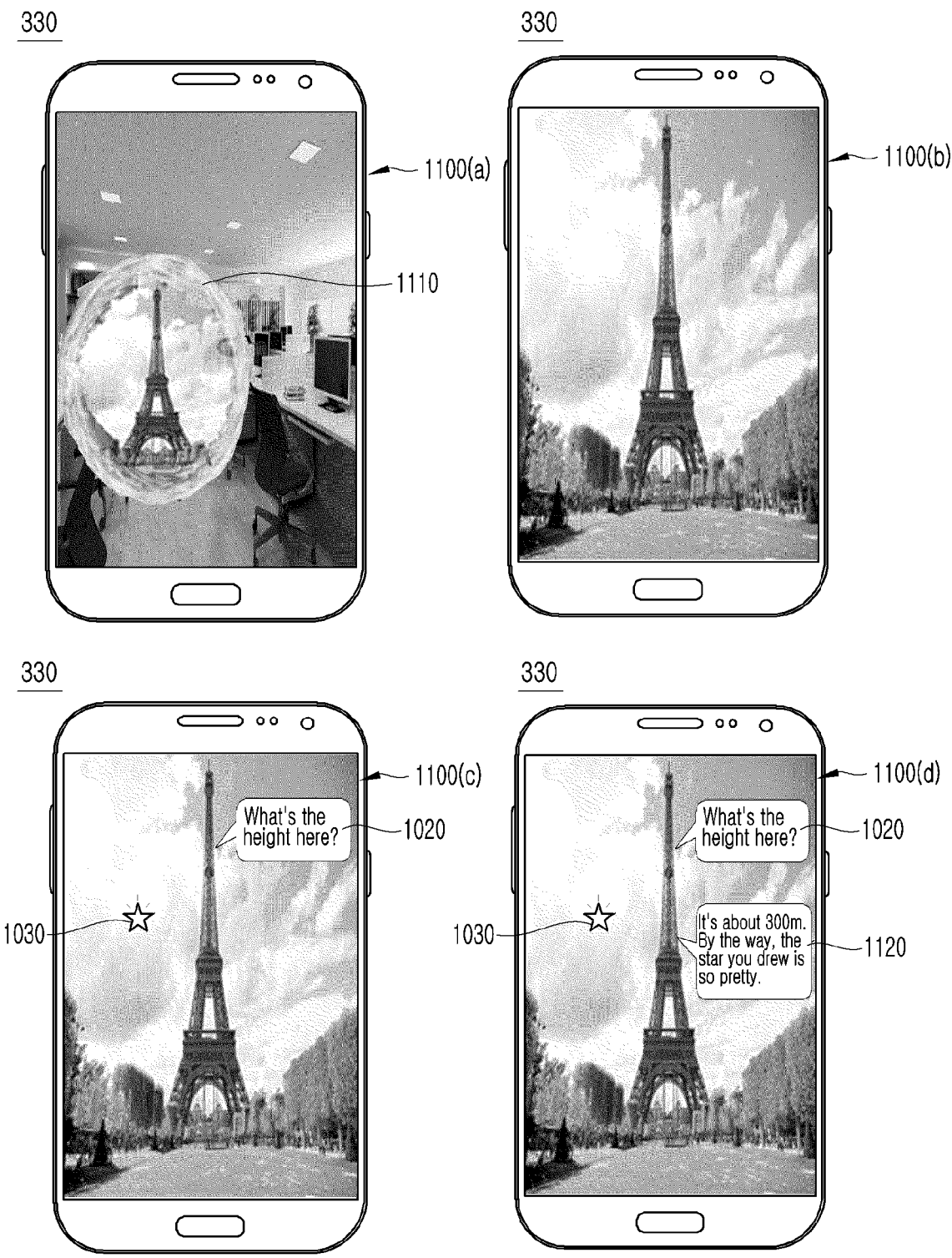
FIG. 11 illustratively shows a situation in which experiences are shared between users according to one embodiment of the invention.
Figure 12A:
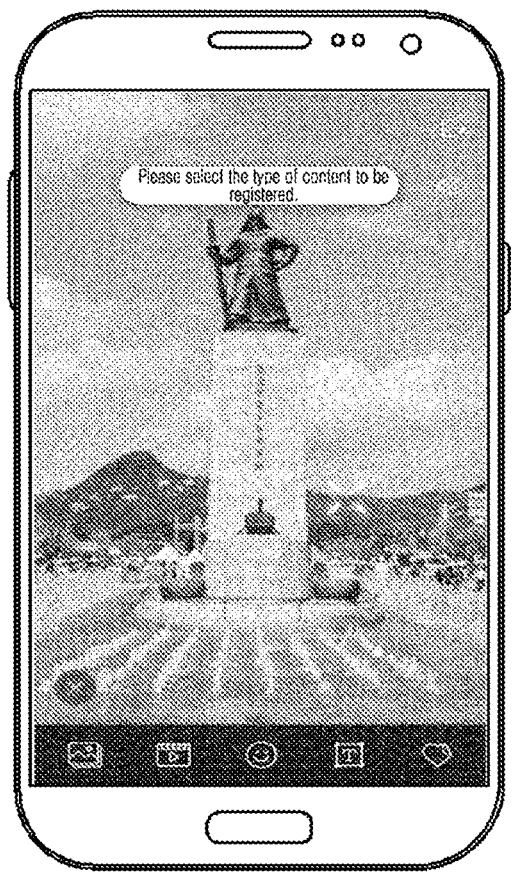
FIGS. 12A and 12B illustratively show a situation in which experiences are shared between users according to one embodiment of the invention.
Figure 12B:
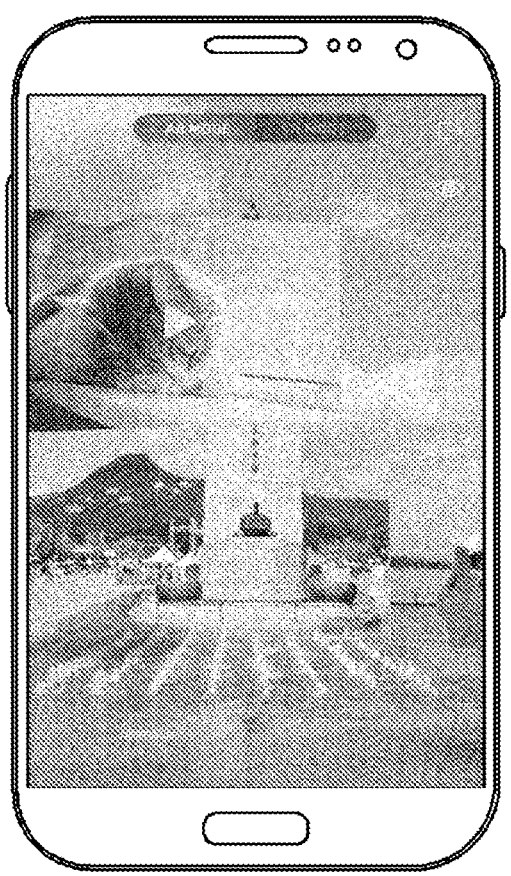
Figure 13A:
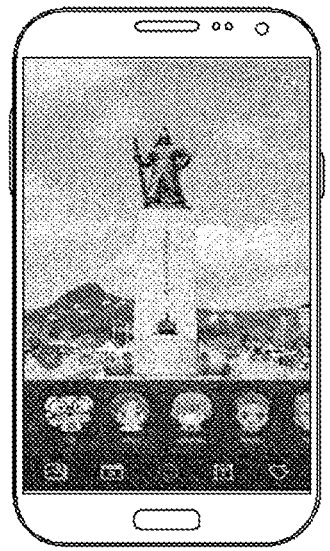
FIGS. 13A to 13E illustratively show a situation in which experiences are shared between users according to one embodiment of the invention.
Figure 13B:
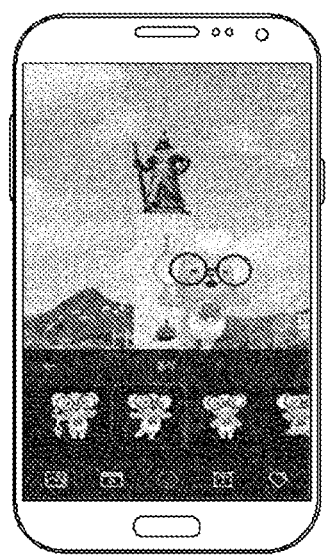
Figure 13C:
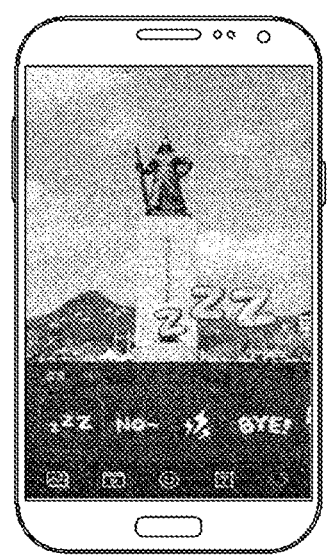
Figure 13D:
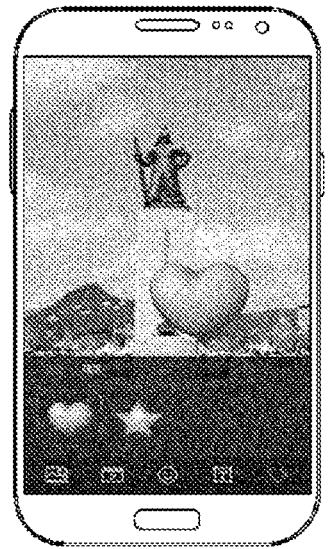
Figure 13E:
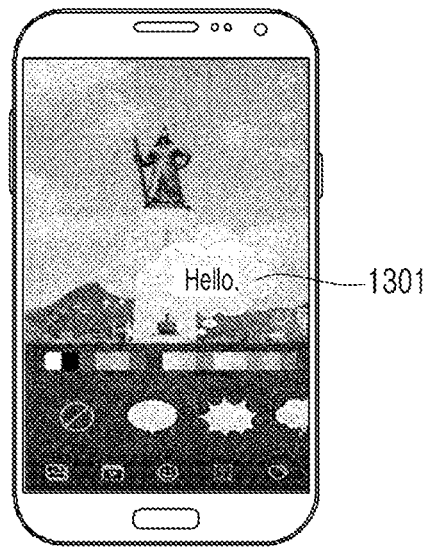

Next, referring to FIGS. 10 and 11, space connection objects 1010 and 1110, which are intended to provide user experiences in which the virtual space is spatially connected with places where the second and third users (specifically, the second and third user devices 320 and 330) are located, may be displayed as augmented on backgrounds of the places where the second and third users are located, respectively (see 1000(*a*) and 1100(*a*)).

Meanwhile, the space connection objects 1010 and 1110 may be created only when it is determined that the second and third users (specifically, the second and third user devices 320 and 330) are located in places that meet a predetermined trigger condition.

Figure 9:
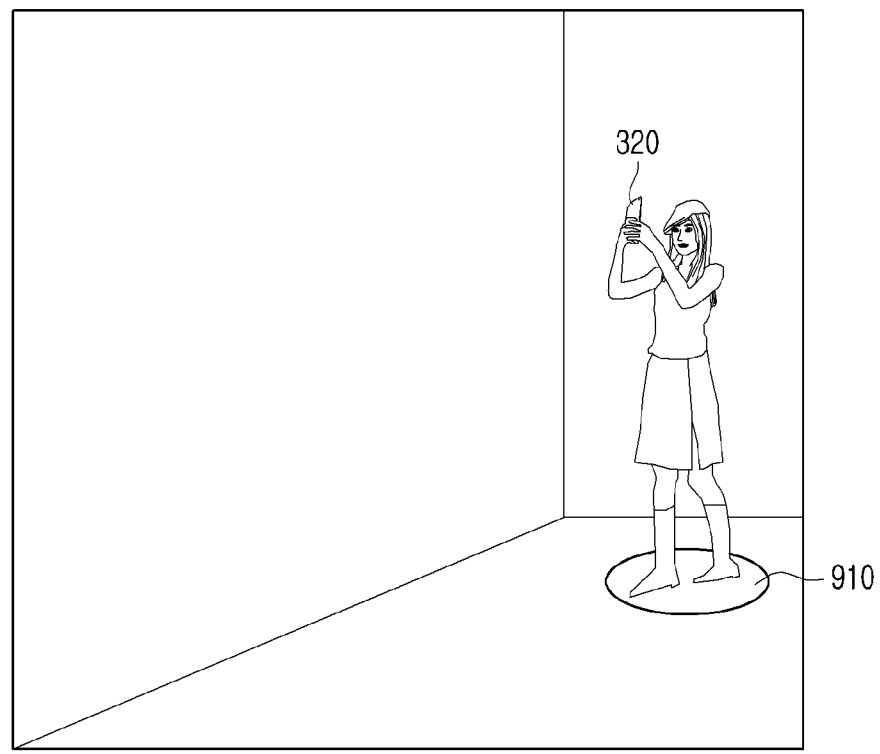
FIG. 9 illustratively shows a situation in which experiences are shared between users according to one embodiment of the invention.

For example, referring to FIG. 9, the space connection object may be created when the second user (specifically, the second user device 320) is located at a corner 910 of a room where the second user may face six surfaces of the room within a predetermined distance.

Next, when the second and third users approach or zoom in toward the space connection objects 1010 and 1110, the virtual space may be displayed to the second and third users, respectively (see 1000(*b*) and 1100(*b*)).

Next, when a first authored content 1020 or 1030 is created by the second user in the virtual space (see 1000(*c*)), the first authored content 1020 or 1030 may be shared with respect to a location matched with the location where the first authored content 1020 or 1030 is created in the virtual space (see 1100(*c*) and 800(*b*)).

Specifically, the first authored content 1020 or 1030 may be shared with respect to a location of the third user in the virtual space that is matched with the location where the first authored content 1020 or 1030 is created in the virtual space (see 1100(*c*)). Further, the first authored content 1020 or 1030 may be shared with respect to a location in the real world that is matched with the location where the first authored content 1020 or 1030 is created in the virtual space (see 800(*b*)).

Next, when a second authored content 1120 is created by the third user in the virtual space (see 1100(*d*)), the second authored content 1120 may be shared with respect to a location matched with the location where the second authored content 1120 is created in the virtual space (see 1000(*d*) and 800(*c*)).

Specifically, the second authored content 1120 may be shared with respect to a location of the second user in the virtual space that is matched with the location where the second authored content 1120 is created in the virtual space (see 1000(*d*)). Further, the second authored content 1120 may be shared with respect to a location in the real world that is matched with the location where the second authored content 1120 is created in the virtual space (see 800(*c*)).

The embodiments according to the invention as described above may be implemented in the form of program instructions that can be executed by various computer components, and may be stored on a computer-readable recording medium. The computer-readable recording medium may include program instructions, data files, and data structures, separately or in combination. The program instructions stored on the computer-readable recording medium may be specially designed and configured for the present invention, or may also be known and available to those skilled in the computer software field. Examples of the computer-readable recording medium include the following: magnetic media such as hard disks, floppy disks and magnetic tapes; optical media such as compact disk-read only memory (CD-ROM) and digital versatile disks (DVDs); magneto-optical media such as floptical disks; and hardware devices such as read-only memory (ROM), random access memory (RAM) and flash memory, which are specially configured to store and execute program instructions. Examples of the program instructions include not only machine language codes created by a compiler, but also high-level language codes that can be executed by a computer using an interpreter. The above hardware devices may be changed to one or more software modules to perform the processes of the present invention, and vice versa.

The recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise.

Although the present invention has been described above in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

What is claimed is:

1. A method for supporting experience sharing between users, the method comprising the steps of:
   acquiring spatial information on a shared content for experience sharing;
   providing a user with the shared content in a virtual space created with reference to the spatial information on the shared content; and
   in response to the user authoring a content and tagging the authored content at a location in the virtual space, sharing the authored content with respect to a location matched with the location where the authored content is tagged in the virtual space,
   wherein the spatial information on the shared content includes information on a theme specified in the shared content,
   wherein the theme is specified as a tangible or intangible object having the greatest importance or percentage in the shared content, or having public awareness at or above a predetermined level, and
   wherein in the providing step, a plurality of videos or images related to a place associated with the shared content are specified with reference to the information on the theme, and the virtual space is created by matching the plurality of videos or images on the basis of at least one of a shape, size, location, and orientation of the theme.

2. The method of claim 1, wherein in the providing step, a space connection object, which is intended to provide a user experience in which the virtual space is spatially connected with a place where the user is located, is displayed as augmented on a background video of the place where the user is located.

3. The method of claim 2, wherein at least a part of the virtual space is projected or overlapped on the space connection object.

4. The method of claim 2, wherein in response to determining that the user is located in a place that meets a predetermined trigger condition, the space connection object is displayed as augmented on the background video of the place where the user is located.

5. The method of claim 1, wherein the virtual space is created on a scale expanded by a predetermined extent compared to a space limited in the shared content.

6. The method of claim 1, wherein in the sharing step, the authored content is displayed as augmented to another user who is located at a real-world location matched with the location where the authored content is tagged in the virtual space.

7. A non-transitory computer-readable recording medium having stored thereon a computer program for executing the method of claim 1.

8. A system for supporting experience sharing between users, the system comprising one or more processors configured to:
   acquire spatial information on a shared content for experience sharing;
   provide a user with the shared content in a virtual space created with reference to the spatial information on the shared content; and
   in response to the user authoring a content and tagging the authored content at a location in the virtual space, share the authored content with respect to a location matched with the location where the authored content is tagged in the virtual space,
   wherein the spatial information on the shared content includes information on a theme specified in the shared content,
   wherein the theme is specified as a tangible or intangible object having the greatest importance or percentage in the shared content, or having public awareness at or above a predetermined level, and
   wherein the one or more processors are configured to specify a plurality of videos or images related to a place associated with the shared content with reference to the information on the theme, and to create the virtual space by matching the plurality of videos or images on the basis of at least one of a shape, size, location, and orientation of the theme.

9. The system of claim 8, wherein the one or more processors are configured to cause a space connection object, which is intended to provide a user experience in which the virtual space is spatially connected with a place where the user is located, to be displayed as augmented on a background video of the place where the user is located.

10. The system of claim 9, wherein at least a part of the virtual space is projected or overlapped on the space connection object.

11. The system of claim 9, wherein the one or more processors are configured to, in response to determining that the user is located in a place that meets a predetermined trigger condition, cause the space connection object to be displayed as augmented on the background video of the place where the user is located.

12. The system of claim 8, wherein the virtual space is created on a scale expanded by a predetermined extent compared to a space limited in the shared content.

13. The system of claim 8, wherein the one or more processors are configured to cause the authored content to be displayed as augmented to another user who is located at a real-world location matched with the location where the authored content is tagged in the virtual space.

* * * * *